United States Patent [19]

Sannes et al.

[11] 4,118,370
[45] Oct. 3, 1978

[54] COLOR-STABILIZED HALOBISPHENOL ETHYLENE POLYCARBONATES

[75] Inventors: Keith N. Sannes, Schenectady; Arnold Factor, Scotia, both of N.Y.

[73] Assignee: General Electric Company, Schenectady, N.Y.

[21] Appl. No.: 668,858

[22] Filed: Mar. 22, 1976

[51] Int. Cl.$^2$ ............................ C08K 5/34; C08K 5/10
[52] U.S. Cl. .................. 260/45.75 W; 260/45.7 PH; 260/45.8 A; 260/45.85 B; 260/45.95R
[58] Field of Search ............... 260/45.85 B, 45.95 R, 260/45.7 PH, 45.8 A, 45.75 W, 45.8 NT, 37 PC

[56] References Cited

U.S. PATENT DOCUMENTS

| | | | |
|---|---|---|---|
| 3,285,855 | 11/1966 | Dexter et al. | 260/45.85 S |
| 3,305,520 | 2/1967 | Fritz et al. | 260/45.7 PH |
| 3,489,716 | 1/1970 | Calkins | 260/45.8 A |
| 3,498,946 | 3/1970 | Calkins | 260/37 PC |
| 3,673,146 | 6/1972 | Factor | 260/45.8 A |
| 3,763,063 | 10/1973 | Factor | 260/47 XA |
| 3,839,247 | 10/1974 | Bialous et al. | 260/47 XA |
| 3,869,423 | 3/1975 | Minagawa et al. | 260/45.8 NT |

FOREIGN PATENT DOCUMENTS 48,893 12/1964 Poland.

OTHER PUBLICATIONS

Mendeleev Chemistry Journal–The Faraday Press Translations of Zhurnal Vses.
Khim. Ob–va im. Mendeleeva – Faraday Press Inc., N.Y., N.Y., published 1969; pp. 198 to 205, article by B. M. Kovarskaya.

*Primary Examiner*—V. P. Hoke
*Attorney, Agent, or Firm*—F. Wesley Turner; Joseph T. Cohen; Charles T. Watts

[57] ABSTRACT

Thermally stable, color-stabilized halobisphenolethylene polycarbonates comprising halobisphenolethylene polycarbonates containing an effective amount of a stabilizing esterified hindered phenol are described. The stabilized halobisphenolethylene polycarbonates can be molded or formed into films, sheets, fibers, laminates or other molded articles including reinforced articles by conventional molding techniques.

9 Claims, No Drawings

COLOR-STABILIZED HALOBISPHENOL ETHYLENE POLYCARBONATES

CROSS-REFERENCES TO RELATED APPLICATIONS

This invention is related to copending U.S. patent application which contains subject matter incorporated herein by reference in its entirety, i.e. Ser. No. 668,857, filed Mar. 22, 1976, which application is filed concurrently herewith and which is assigned to the same assignee as the assignee of this invention.

BACKGROUND OF THE INVENTION

1. Field of the Invention

This invention relates to thermally stable, color-stabilized polycarbonates comprising halobisphenolethylene polycarbonates containing an effective amount of a stabilizing esterified hindered phenol.

2. Description of the Prior Art

The prior art has made limited observations regarding the properties of chlorobisphenolethylene polycarbonates such as the infra-red spectroscopic data by Z. Wielgosz, Z. Boranowska and K. Janicka, reported in *Plaste und Kautschuk* 19 (12) 902 (1972). Observations regarding attempts to stabilize chlorobisphenolethylene polycarbonates are reported by Z. Gobiczewski, Z. Wielgosz and K. Janicka in *Plaste und Kautschuk* 16 (2) 99 (1969) which describe the ineffectiveness of commercially available hindered phenols, e.g. Parmanox, i.e. 2,6-di-t-butyl-4-methylphenol, Topanol CA, i.e. 2,2,3-tris(2-methyl-4-hydroxy-5-t-butylphenyl)butane, and Jonox 330, i.e., 1,3,5-tris(3,5-di-t-butyl-4-hydroxybenzyl)benzene as stabilizers for chlorobisphenolethylene polycarbonates at elevated temperatures, e.g. from 160° to 260° C. No other art is known of regarding attempts to stabilize chlorobisphenolethylene polycarbonates.

Unexpectedly, it has been found that certain esterified hindered phenols stabilize halobisphenolethylene polycarbonates against deleterious thermal effects — as evidenced by reduced color degradation of esterified hindered phenol stabilized halobisphenolethylene polycarbonates after having been subjected to thermal stresses at elevated temperatures.

DESCRIPTION OF THE INVENTION

This invention embodies thermally stable, color-stabilized halobisphenolethylene polycarbonates comprising halobisphenolethylene polycarbonates containing an effective amount of a stabilizing esterified hindered phenol.

As used herein and in the appended claims, the term "esterified hindered phenol" includes any hindered phenol of the general formulae:

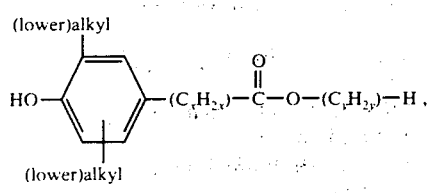

in which $x$ has a value of from 0 to 6, inclusively, and $y$ has a value of from 6 to 30, inclusively;

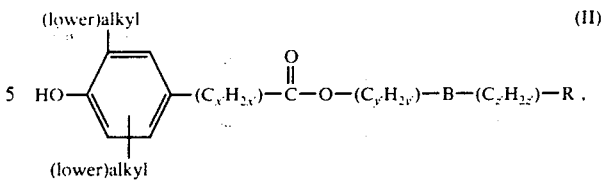

wherein $x'$ has a value of from 0 to 6, inclusively, each of $y'$ and $z'$ has a value of from 2 to 20, inclusively, R is a member consisting of hydrogen, alkanoyloxy or

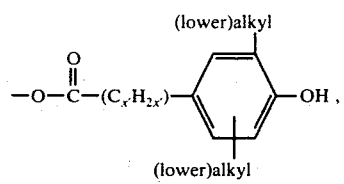

B is a member consisting of a divalent oxygen atom or the group

in which A is alkyl or alkanoyl; and

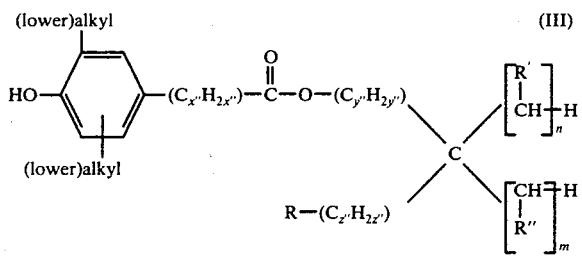

in which R is hydrogen, alkanoyloxy, or

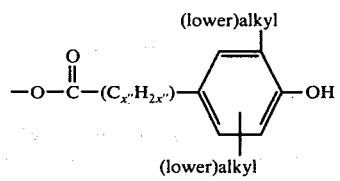

each of R' and R" is alkanoyloxy or

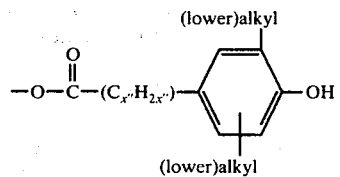

$x''$ has a value of from 1 to 6, inclusively, wherein each of $y''$, $z''$, $n$ and $m$ independently has a value of from 0 to 6, inclusively, at least one of $y''$, $z''$, $n$ and $m$ having a value other than 0 and the sum of $n$ and $m$ being no greater than 6 and being at least 1 when R is hydrogen and the sum of $y''$ and $z''$ being at least 1 when R is other than hydrogen, and

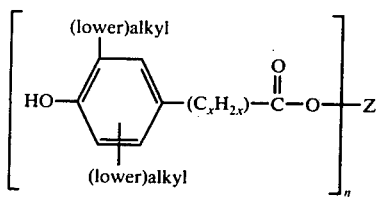

(IV)

wherein x has a value of from 1 to 6, n has a value of from 2 to 6, Z is an aliphatic hydrocarbon of the formula:

$C_yH_{2y+2-n}$, in which y has a value of from 2 to 18 when n is 2 and a value of 3 to 6 when n is greater than 2, the value of y in all cases being equal to or greater than that of n, or Z is heterocyclic of the formula:

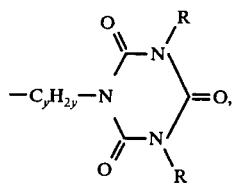

in which y has a value of from 1 to 6, R is a member consisting of alkyl or

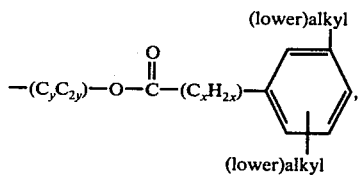

in which x has a value of from 1 to 6 and y has a value of from 1 to 6.

Typical of some esterified hindered phenols of Formula I are the following:
n-octadecyl 3,5-di-t-butyl-4-hydroxyphenylacetate;
n-octadecyl 3,5-di-t-butyl-4-hydroxybenzoate;
n-hexyl 3,5-di-t-butyl-4-hydroxyphenylbenzoate;
n-dodecyl 3,5-di-t-butyl-4-hydroxyphenylbenzoate;
neo-dodecyl 3-(3,5-di-t-butyl-4-hydroxyphenyl)propionate;
dodecyl-β-(3,5-di-t-butyl-4-hydroxyphenyl)propionate;
ethyl-α-(4-hydroxy-3,5-di-t-butylphenyl)isobutyrate;
octadecyl α-(4-hydroxy-3,5-di-t-butylphenyl)isobutyrate;
octadecyl α-(4-hydroxy-3,5-di-t-butylphenyl)propionate;
n-octadecyl-β-(3,5-di-t-butyl-4-hydroxyphenyl)propionate, etc.

Typical of some esterified hindered phenols of Formula II are the following:
2-(n-octyloxy)ethyl-3,5-di-t-butyl-4-hydroxybenzoate;
2-(n-octyloxy)ethyl-3,5-di-t-butyl-4-hydroxyphenylacetate;
2-(n-octadecyloxy)ethyl-3,5-di-t-butyl-4-hydroxyphenylacetate;
2-(n-octadecyloxy)ethyl-3,5-di-t-butyl-4-hydroxybenzoate;
2-(2-hydroxyethyloxy)ethyl 3,5-di-t-butyl-4-hydroxy benzoate;
β,β-oxydiethyl bis-(3,5-di-t-butyl-4-hydroxyphenylacetate);
diethylene glycol bis-[3-(3,5-di-t-butyl-4-hydroxyphenyl)propionate];
2-(n-octadecyloxy)ethyl-3-(3,5-di-t-butyl-4-hydroxyphenyl)propionate;
oxy-bis[ethylene 3-(3,5-di-t-butyl-4-hydroxyphenyl)propionate];
n-butylimino N,N-bis[ethylene-3-(3,5-di-t-butyl-4-hydroxyphenyl)propionate];
2-(2-stearoyloxyethyloxy)ethyl-3,5-di-t-butyl-4-hydroxybenzoate;
2-(2-hydroxyethyloxy)ethyl-7-(3-methyl-5-t-butyl-4-hydroxyphenyl)heptanoate;
2-(2-stearoyloxyethyloxy)ethyl 7-(3-methyl-5-t-butyl-4-hydroxyphenyl)heptanoate, etc.

Typical of some esterified hindered phenols of formula III are the following:
1,2-propylene glycol bis[3-(3,5-di-t-butyl-4-hydroxyphenyl)propionate];
ethylene glycol bis[3-(3,5-di-t-butyl-4-hydroxyphenyl)propionate];
neopentylglycol bis[3-(3,5-di-t-butyl-4-hydroxyphenyl)propionate];
ethylene glycol bis-(3,5-di-t-butyl-4-hydroxyphenylacetate);
glycerine-1-n-octadecanoate-2,3-bis-(3,5-di-t-butyl-4-hydroxyphenylacetate);
tetra[methylene 3-(3,5-di-t-butyl-4-hydroxyphenyl)propionate]methane;
n-propyl 1,1,1-tris[methylene 3-(3,5-di-t-butyl-4-hydroxyphenyl)propionate];
sorbitol hexa[3-(3,5-di-t-butyl-4-hydroxyphenyl)propionate];
1,2,3-butanetriol tris[3-(3,5-di-t-butyl-4-hydroxyphenyl)propionate];
2-hydroxyethyl-7-(3-methyl-5-t-butyl-4-hydroxyphenyl)heptanoate;
2-stearoyloxyethyl-7-(3-methyl-5-t-butyl-4-hydroxyphenyl)heptanoate;
n-ethyl-1,1,1-tris[methylene 3-(3,5-di-t-butyl-4-hydroxyphenyl)propionate], etc.

Typical of some esterified hindered phenols of formula IV are the following:
pentaerythritol tetrakis[3-(3,5-di-t-butyl-4-hydroxyphenyl)propionate];
1,1,1-trimethylolethane tris[3-(3,5-di-t-butyl-4-hydroxyphenyl)propionate];
1,1,1-trimethylolpropane tris[3-(3,5-di-t-butyl-4-hydroxyphenyl)propionate];
1,1,1-trimethylolpropane tris[3-(3,5-di-t-butyl-4-hydroxyphenyl)propionate];
glycerine tris[3-(3,5-di-t-butyl-4-hydroxyphenyl)propionate];
sorbitol hexakis[3-(3,5-di-t-butyl-4-hydroxyphenyl)propionate];
pentaerythritol tetrakis[3-(3-methyl-4-hydroxy-t-t-butylphenyl)propionate];
pentaerythritol tetrakis[3-(3,5-dimethyl-4-hydroxyphenyl)propionate];
3,5-di-t-butyl-4-hydroxyhydrocinnamic acid triester of 1,3,5-tris(2-hydroxyethyl)-S-triazine-2,4,6-(1H,3H,5H)-trione;

3-methyl-5-t-butyl-4-hydroxybenzoic acid triester of 1,3,5-tris(2-hydroxyethyl)-S-triazine-2,4,6-(1H, 3H, 5H)-trione;

3-methyl-5-t-butyl-4-hydroxyphenylacetic acid triester of 1,3,5-tris(2-hydroxypropyl)-S-triazine-2,4,6-(1H, 3H, 5H)-trione;

3,5-di-t-butyl-4-hydroxyhydrocinnamic acid triester of 1,3,5-tris(2-hydroxypropyl)-S-triazine-2,4,6-(1H, 3H, 5H)-trione;

3,5-di-t-butyl-4-hydroxyphenol acetic acid triester of 1,3,5-tris(2-hydroxybutyl)-S-triazine-2,4,6-(1H, 3H, 5H)-trione, etc.

As used herein and in the appended claims, the term "alkyl" and derivations thereof such as "alkylene" or "alkanoyl" is intended as a group containing a branched or straight chain hydrocarbon chain of from 1 to 20 carbon atoms inclusively. Representative of such alkyl groups are thus methyl, ethyl, propyl, butyl, 1-butyl, octyl, decyl, dodecyl, tetradecyl, octadecyl, eicosyl and the like.

When the term "alkyl" is herein qualified by the designation "(lower)," there is intended a branched or straight chain hydrocarbon of from 1 to about 10 carbon atoms.

It will be observed, that the di(lower)alkylphenol moiety in formulae I–IV and embodiments thereof, exhibits at least one (lower)alkyl group in a position ortho to the hydroxy group. The other (lower)alkyl group is either (a) in the other position ortho to the hydroxy group or (b) meta to the hydroxy group and para to the first (lower)alkyl group. Although not so limited, these (lower)alkyl groups are preferably branched such as t-butyl.

The esterified hindered phenols described hereinbefore are well-known to those skilled in the art as illustrated by disclosures thereof in U.S. Pat. Nos. 3,285,855, 3,644,482, etc., among others.

As used herein and in the appended claims, the term "halobisphenolethylene polycarbonate" includes any polycarbonate composition containing within the polycarbonate skeletal backbone "halobis(phenyl)ethylene carbonate" units of the formula:

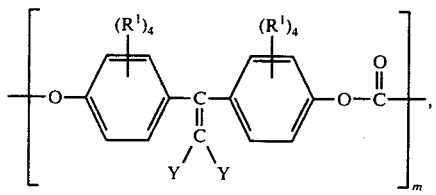

(V)

wherein independently each $R^1$ is hydrogen, chlorine, bromine, or a $C_{1-30}$ monovalent hydrocarbon or hydrocarbonoxy, each Y is hydrogen, chlorine, or bromine, subject to the proviso that at least one Y is chlorine or bromine, and m is an integer of at least 2. Presently preferred monovalent hydrocarbon groups are $C_{1-4}$ alkyl or phenyl. More preferred polycarbonates contain units of formula V, wherein each $R^1$ is hydrogen and each Y is chlorine. Polycarbonates containing only recurring moieties of formula V are halobisphenolethylene homopolycarbonates as defined herein in the appended claims.

Included within the scope of this invention are halobisphenolethylene polycarbonates containing both halobis(phenyl)ethylene carbonate units of formula V as well as "arene carbonate" units of the formula:

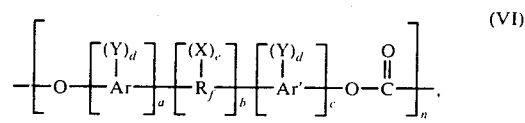

(VI)

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, a halogen, an ether group of the formula-OE, wherein E is a monovalent hydrocarbon radical similar to X, a monovalent hydrocarbon group of the type represented by $R_f$, d represents a whole number of at least 1, c represents a whole number equal to at least 0 or more, a, b and c represent whole numbers including 0, a or c but not both may be 0, and wherein n is an integer of at least 2.

Preferred copolycarbonates included within the scope of this invention are polycarbonates containing both the halobis(phenyl)ethylene carbonate units of formula V as well as arene carbonate units of the formula:

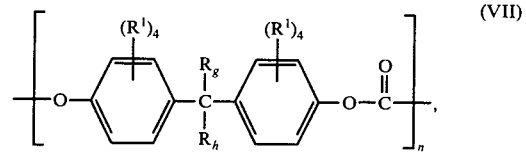

(VII)

wherein independently each $R^1$ is hydrogen, chlorine, bromine or a $C_{1-30}$ monovalent hydrocarbon group, independently $R_g$ and $R_h$ are hydrogen or a $C_{1-30}$ monovalent hydrocarbon group and n is an integer of at least 2. Presently preferred monovalent hydrocarbon groups are $C_{1-4}$ alkyl or phenyl. More preferred copolycarbonates contain bisphenyl carbonate units of formula VII wherein each $R^1$ is hydrogen and $R_g$ and $R_h$ are methyl.

Halobisphenolethylene polycarbonates can be prepared by methods known to those skilled in the art such as those described by S. Porejko et al., Polish Pat. No. 48,893, issued Dec. 12, 1964, entitled *Process for Synthesizing Self-Extinguishing Thermoplastics* and Z. Wielgosz et al., Polimery 17, 76 (1972). In general, the S. Porejko et al. and Z. Wielgosz et al. methods describe reactions of a chlorobisphenolethylene, i.e. 1,1-dichloro-2,2-bis(4-hydroxyphenyl)ethylene and bisphenol-A, i.e. bis(4-hydroxyphenyl)propane-2,2 mixture with a carbonate precursor, e.g. phosgene and an acid acceptor, e.g. caustic soda and a catalyst, e.g. triethylamine, wherein the reaction are carried out under conventional phosgenating reaction conditions, i.e. reaction conditions generally associated with the phosgenation of bisphenol-A as described in the Encyclopedia of Polymer Science and Technology 10 entitled *Polycarbonates*, pages 710–764, Interscience Publishers (1969).

Illustrative of some halobisphenolethylenes that can be employed in the preparation of homo- and co-polycarbonates in accordance with the phosgenating reaction conditions described by S. Porejko et al. and Z. Wielgosz et al. as well as those described in the Encyclopedia of Polymer Science follow:

1,1-dibromo-2,2-bis(4-hydroxyphenyl)ethylene;
1,1-dichloro-2,2-bis(5-methyl-4-hydroxyphenyl)ethylene;
1,1-dibromo-2,2-bis(3,6-n-butyl-4-hydroxyphenyl)ethylene;
1,1-dichloro-2,2-bis(2-chloro-5-ethyl-4-hydroxyphenyl)ethylene;
1,1-dibromo-2,2-bis(2,5-dibromo-4-hydroxyphenyl)ethylene;
1-bromo-2,2-bis(4-hydroxyphenyl)ethylene;
1-chloro-2,2-bis(3,5-di-isopropyl-4-hydroxyphenyl)ethylene;
1-bromo-2,2-bis(2,6-di-t-butyl-4-hydroxyphenyl)ethylene;
1-chloro-2,2-bis(2,6-dichloro-4-hydroxyphenyl)ethylene;
1-bromo-2,2-bis(2,3-dibromo-4-hydroxyphenyl)ethylene;
1,1-dichloro-2,2-bis(3,5-dichloro-4-hydroxyphenyl)ethylene;
1,1-dichloro-2,2-bis(3,5-dibromo-4-hydroxyphenyl)ethylene;
1,1-dibromo-2,2-bis(5-chloro-4-hydroxy)ethylene;
1-chloro-2,2-bis(3,6-dibromo-4-hydroxyphenyl)ethylene;
1-bromo-2,2-bis(2-chloro-4-hydroxyphenyl)ethylene;
1,1-dichloro-2,2-bis(2,3,5-trichloro-4-hydroxyphenyl)ethylene;
1,1-dibromo-2,2-bis(2,3,5,6-tetrabromo-4-hydroxyphenyl)ethylene;
1-chloro-2,2-bis(3-phenyl-4-hydroxyphenyl)ethylene;
1-bromo-2,2-bis(3,5-diphenyl-4-hydroxyphenyl)ethylene;
1,1-dichloro-2,2-bis(2,6-diphenyl-4-hydroxyphenyl)ethylene;
1,1-dibromo-2,2-bis(3-bromo-5-phenyl-4-hydroxyphenyl)ethylene;
1-chloro-2,2-bis(3-methoxy-4-hydroxyphenyl)ethylene;
1-bromo-2,2-bis(3,5-dimethoxy-4-hydroxyphenyl)ethylene;
1,1-dichloro-2,2-bis(2-ethoxy-4-hydroxyphenyl)ethylene;
1,1-dibromo-2,2-bis(2,6-diethoxy-4-hydroxyphenyl)ethylene;
1-chloro-2,2-bis(5-phenylether-4-hydroxyphenyl)ethylene;
1-bromo-2,2-bis(3,5-diphenylether-4-hydroxyphenyl)ethylene;
1,1-dichloro-2,2-bis(3-chloro-5-phenylether-4-hydroxyphenyl)ethylene;
1,1-dibromo-2,2-bis(2-bromo-5-phenylether-4-hydroxyphenyl)ethylene; etc.,
among many others.

Illustrative of some arene dihydroxy compounds that can be employed in the preparation of halobisphenolethylene polycarbonates or blends of halobisphenolethylene polycarbonates with other polycarbonates contain phenyl carbonate units of formulas VI and VII in accordance with the phosgenating reaction conditions described by Wielgosz et al., S. Porejko et al., as well as those described in the aforesaid Encyclopedia of Polymer Science publication follow:
resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-4-fluorophenylmethyl methane;
4,4'-dihydroxy-diphenyl-2-naphthylmethyl methane;
4,4'-dihydroxy-tetraphenyl methane;
4,4'-dihydroxy-diphenyl phenylcyano methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-diphenyl;
α,α,α',α'-tetramethyl-α,α'-(di-p-hydroxyphenyl)-p-xylylene;
α,α,α',α'-tetramethyl-α,α'-(di-p-hydroxyphenyl)-m-xylylene;
2,2'-dihydroxy-3,3',5,5'-tetramethyldiphenyl methane;
4,4'-dihydroxy-3,3'-dimethyl-diphenyl methane;
4,4'-dihydroxy-2,2'-dimethyl-diphenyl methane;
4,4'-dihydroxy-3,3',5,5'-tetramethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2',3,3',5,5',6,6'-octamethyldiphenyl methane;
4,4'-dihydroxy-2,2'-dimethyl-5,5'-diisopropyldiphenyl methane;
4,4'-dihydroxy-2,2'-dimethyl-5,5'-dipropyl-diphenyl methane;
4,4'-dihydroxy-2,2'-dimethyl-5,5'-di-tert.-butyldiphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-3,3'-dimethyl-diphenyl-3,3-butanone-2;

4,4'-dihydroxy-diphenyl-4,4-hexanone-3;
4,4'-dihydroxy-diphenylmethyl-4-methoxy-phenyl methane;
4,4'-dihydroxy-diphenyl ether;
4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
4,4'-dihydroxy-3,3',5,5'-tetramethyl-diphenyl methane;
4,4'-dihydroxy-3,3',5,5'-tetrachloro-diphenyl-1,1-cyclohexane;
4,4'-dihydroxy-3,3',5,5'-tetrachloro-diphenyl-2,2-propane;
4,4'-dihydroxy-3,3',5,5'-tetramethyl-2,2',6,6'-tetrabromo-diphenyl-2,2-propane; and
4,4'-dihydroxy-3,3',5,5'-tetrabromo-diphenyl-2,2-propane, etc., among many others.

Presently preferred halobisphenolethylene polycarbonates exhibit an intrinsic viscosity of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful halobisphenolethylene polycarbonates generally have an intrinsic viscosity within the range of from about 0.38 to about 0.7 dl./g. Preferably, the halobisphenolethylene polycarbonates contain a sufficient number of repeating units of formulas V, or V and VI or VII, set out hereinbefore, to give a number average molecular weight of homo- or copolycarbonates — including blends thereof with other polycarbonates — of at least about 5,000, and more preferably a number average molecular weight of from about 10,000 to about 50,000. Polycarbonates of such molecular weight characteristics process easily inbetween about 450° F. and 650° F.

Blends of halobisphenolethylene polycarbonates and any other polycarbonate containing arenecarbonate units of formulas VI or VII, as described hereinbefore, are included within the scope of this invention, and can be prepared by any means known to those skilled in the art. Preferred blends are prepared by heating admixtures of a halobisphenolethylene polycarbonates and any other polycarbonate to a temperature above their softening point(s). Preferably, the mixing or blending is carried out — when carried out in the absence of a solvent — at the aforesaid elevated temperature, i.e. above their softening point(s), while subjecting the admixture to mechanical working. Accordingly, blends can be mixed with such equipment as extruders including mono- and multiple screw types, internal Banbury mixers, roll mills, or any other mechanical equipment which will subject the admixture to shear stresses at elevated temperatures.

In general, the halobisphenolethylene polycarbonate compositions of this invention can contain other ingredients in addition to the stabilizer components described herein such as pigments, reinforcing and nonreinforcing fillers, mold release agents, ultraviolet light, stabilizers, antioxidants, drip retarding agents, surfactant agents, etc.

Useful in the practice of this invention are halobisphenolethylene polycarbonates that contain — in addition to an esterified hindered phenol — an organic phosphite. As used herein and in the appended claims, the term "organic phosphite" includes any hydrocarbylphosphite of the general formula:

(VIII)

where $R_1$, $R_2$ and $R_3$ are independently selected from the group consisting of hydrogen, alkyl, aryl, cycloalkyl, arylalkyl and alkylaryl and combinations thereof subject to the proviso that at least one of $R_1$, $R_2$ or $R_3$ is other than hydrogen or a group directly bonded to an oxygen atom by phenyl ring carbon atom, subject to the proviso that when $R_2$ and $R_3$ are phenyl, $R_1$ can be hydrogen. Preferably the radicals have 1 to 20 carbon atoms. The alkyl may be methyl, ethyl, propyl, isopropyl, the various butyl isomers, e.g., butyl, sec.-butyl, tert.-butyl, the various amyl isomers, the various hexyl isomers, the various nonyl isomers, the various eicosyl isomers, etc.; the cycloalkyl may be cyclobutyl, cyclopentyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyls substituted with one or more of the above aryl groups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyl dodecyl phosphite, diphenyl phosphite, di-(t-butylphenyl)octyl phosphite, triethyl phosphite, tris(nonylphenyl)phosphite, dipropylphenyl phosphite, etc. The preferred phosphites to be employed herein are diaryl phosphites, e.g., diphenyl phosphite, etc., and diaryl alkyl phosphites, e.g., diphenyl decyl phosphite, etc.

Especially useful in the practice of this invention are halobisphenolethylene polycarbonates that contain — in addition to an esterified hindered phenol and an organic phosphite — an epoxy compound, i.e. compounds which possess at least one 1,2-epoxide group of the formula:

(IX)

Any saturated or unsaturated epoxy compound can be employed including aliphatic, cycloaliphatic, aromatic or heterocyclic epoxides — which are defined herein and in the appended claims as "epoxides". The epoxides may be substituted — if desired — with noninterfering substituents, such as halogen atoms, phosphorus atoms, ether radicals and the like. The epoxides may also be monomeric or polymeric and include epoxides derived from both synthetic and natural sources.

Illustrative of some presently preferred aliphatic epoxides that may be employed are represented by the formula:

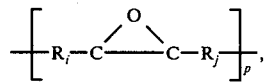

wherein $R_i$ and $R_j$ are independently selected from $C_{1-24}$ alkyl, and $p$ is an integer of from 1 to about 10.

Illustrative of some presently preferred cycloaliphatic epoxides that may be employed are epoxidized cycloaliphatic compounds containing 1-2 cycloaliphatic rings of 6 carbon atoms each with at least one oxygen bridge bring attached to adjacent carbon atoms in at least one cycloaliphatic ring.

Illustrative of some presently preferred aromatic epoxides that may be employed are aromatic glycidyl ethers or aromatic diglycidyl ethers containing 1-3 rings, or aromatic polyglycidyl ethers containing 1-3 aromatic rings.

Illustrative of some specific examples of some of the members of the above epoxide groups that can be employed are the following: butadiene diepoxide, epoxidized polybutadiene, diglycidyl ether, bisphenol-A diglycidyl ether, diglycidyl ester of phthalic acid, diglycidyl ester of hexahydrophthalic acid, epoxidized soybean oil, tetraphenylethylene epoxide, octyl epoxy tallate, 3,4-epoxycyclohexylmethyl 3,4-epoxycyclohexane carboxylate, 3,4-epoxy-6-methylcyclohexylmethyl-3,4-epoxy-6-methylcyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, di-3,4-epoxy-6-methylcyclohexylmethyl adipate, cyclohexylmethyl 3,4-epoxycyclohexane carboxylate and 3,4-epoxy-6-methylcyclohexylmethyl 6-methylcyclohexyl carboxylate. Generally preferred epoxides contain from about 3 to up to about 30 carbon atoms. Presently preferred epoxides are bisphenol-A diglycidyl ether and 3,4-epoxycyclohexylmethyl-3,4-epoxy cyclohexane carboxylate.

In addition to the esterified hindered phenols which can be employed either alone or in combination with organic phosphites and/or epoxy compounds to impart thermal and color stability to halobisphenolethylene polycarbonates, another embodiment of this invention comprises the use of cadmium, barium, and/or cerium salts of aliphatic, cycloaliphatic, aromatic carboxylic acids or carbonic acids — which are defined herein and in the appended claims as "metal salts". Preferred cadmium, barium and/or cerium salts are salts of $C_{2-20}$ alkanoic, $C_{7-20}$ benzoic or carbonic acids, and mixtures thereof. Illustrative of some of the cadmium, barium and cerium salts of $C_{2-20}$ alkanoic, $C_{7-20}$ benzoic or carbonic acids that can be employed are metal salts, such as cadmium, barium or cerium acetate, butyrate, hexanoate, octanoate, dodecanoate, stearate, eicosanoate, cyclohexane carboxylate, benzoate, phthaloate, isophthaloate, terephthaloate, toluoate, naphthoates, carbonates, etc., among many others. The preferred salts employed herein are cadmium, barium or cerium 2-ethylhexanoate. In general, when employing the cadmium, barium or cerium salts of the aforesaid organic acids, it is preferred that a stabilizing amount of an organic acid corresponding to the acid types described hereinbefore be employed in addition to the cadmium, barium or cerium salts.

Stabilizing esterified hindered phenol combinations, as used herein and in the appended claims, include combinations of (1) esterified hindered phenol(s), (2) esterified hindered phenol(s) and organic phosphite(s), (3) esterified hindered phenol(s) and organic epoxide(s), or (4) esterified hindered phenol(s) organic phosphite(s), an epoxide(s) and a cadmium, barium or cesium salt(s) of an aliphatic, cycloaliphatic, aromatic carboxylic acid(s) or carbonic acid(s), or a mixture including the components of (4) and an organic acid corresponding to those associated with the cadmium, barium and cesium salts referenced herein. In general, the amount of esterified hindered phenol stabilizer or other stabilizer component employed is any effective amount, i.e. any amount which increases the thermal or color stability of halobisphenolethylene polycarbonates. In general — as used herein and in the appended claims — an effective amount can be as little as 0.010 or even lower to as much as 5.0 parts or even higher of stabilizer or stabilizer combination per 100 parts of halobisphenolethylene polycarbonate on a weight basis. For functional as well as economic considerations, in general, optimum amounts generally range from about 0.025 to about 1.0 parts of stabilizer or stabilizer combination per 100 parts of halobisphenolethylene polycarbonate. In a presently preferred embodiment a stabilizer combination comprises from about 0.05 to about 0.20 parts of an esterified hindered phenol, from about 0.05 to about 0.20 parts of an organic phosphite, from about 0.05 to about 0.20 parts of epoxide and from about 0.05 to about 0.20 parts of a cadmium, barium or cesium salt of a $C_{2-20}$ alkanoic $C_{7-20}$ benzoic or carbonic acid per 100 parts by weight of halobisphenolethylene polycarbonate composition.

The following examples illustrate — but do not limit — the best method of practicing the invention. Unless otherwise indicated in the examples, the following general procedures were employed in the preparation and testing of the stabilizers for the halobisphenolethylene polycarbonates. Deviations from the general procedure are noted in the specific examples.

GENERAL PROCEDURE

A series of chlorobisphenolethylene polycarbonates were prepared by the reaction of an aqueous alkaline solution of 1,1-dichloro-2,2-bis(4-hydroxyphenyl)ethylene with phosgene carried out in the presence of triethylamine and methylene chloride in the temperature range of from about 0° to about 40° C. to form a high molecular weight chlorobisphenol polycarbonate having an intrinsic viscosity as measured in methylene chloride at a temperature of 25.3° C. of 0.525 dl./g. Each stabilizer or stabilizer combination was combined with the chlorobisphenol polycarbonate by (1) coating a chlorobisphenolethylene polycarbonate powder with a solution containing a test stabilizer or stabilizer combination, (2) evaporating the solvent, which in most cases was a nonsolvent for the chlorobisphenolethylene polycarbonate, (3) compressing at room temperature 750 milligrams of the coated chlorobisphenolethylene polycarbonate resin into a premelt pellet, (4) compressing at 240° C. and 8,000 psi a pellet into a transparent disc one inch by 37 mills thick, (5) exposing the resulting disc at 315° C. and 8,000 psi for an additional 15 minutes, and (6) measuring the color of the exposed disc by measuring the light absorbance at 425 nm in a one cm. cell of a solution prepared by dissolving 52 milligrams of the exposed disc in one milliliters of methylene chloride. A low numerical absorbance value, e.g. 0.184, compared to a high absorption value, e.g. 0.335, defines a most stable and a least stable halobisphenolethylene polycarbonate, respectively.

EXAMPLES 1-3

Summarized in Table I hereafter are the absorption data associated with a control sample of 1,1-dichloro-2,2-bis(4-hydroxyphenyl)ethylene polycarbonate containing no stabilizing component, 1,1-dichloro-2,2-bis(4-hydroxyphenyl)ethylene polycarbonate containing an esterified hindered phenol. The quantity of stabilizer component is also noted.

TABLE I

| Ex. No. | Stabilizer Component | Amount (phr) | Absorbance (425 nm) |
|---|---|---|---|
| 1 | control | none | 0.335 |
| 2 | pentaerythritol tetrakis[3(3,5-di-t-butyl-4-hydroxyphenyl)propionated] | 0.15 | 0.184 |
| 3 | pentaerythritol tetrakis[3(3,5-di-t-butyl-4-hydroxyphenyl)propionate] | 1.0 | 0.250 |

The above data illustrates that esterified hindered phenols are effective stabilizers for "halobisphenolethylene carbonates".

EXAMPLES 4–12

Summarized in Table II hereafter is data in a form analogous to that set out in Table I. In these examples, the samples were given a final exposure at 300° C. and 8,000 psi for 5 minutes. The color absorption data was measured at a light wavelength of 425 nm in a 1 cm. cell using a solution prepared by dissolving 100 milligrams of the exposed disc in 5 milliliter of chloroform.

TABLE II

| Ex. No. | Stabilizer component | Amount (phr) | Absorbance (425 nm) |
|---|---|---|---|
| 4 | control | none | 0.048 |
| 5 | octadecyl-α-(4-hydroxy-3,5-di-t-butylphenyl)propionate | 0.15 | 0.024 |
| 6* | tris-1,2,5-methyl-tris-2,4,6(3,5-di-t-butyl-4-hydroxybenzyl) | 0.15 | 0.059 |
| 7* | thio-bis[ethylene 3(3,5-di-t-butyl-4-hydroxyphenyl)propionate] | 0.15 | 0.060 |
| 8* | 1-nonyl-3,5-di-t-butylphenol | 0.15 | 0.065 |
| 9* | thio-bis(3-methyl-5-t-butylphenol) | 0.15 | 0.105 |
| 10* | bis(3,5-di-t-butyl-4-hydroxy)methane | 0.15 | 0.231 |
| 11* | (3,5-di-t-butyl-4-hydroxyphenyl)-methanol | 0.15 | 0.400 |
| 12* | bis(3,5-di-t-butyl-4-hydroxybenzyl)-ether | 0.15 | 0.638 |

*comparative data - not part of the invention.

The above data illustrates that all hindered phenols are not effective stabilizers for "halobisphenolethylene carbonates".

EXAMPLES 13–16

Summarized in Table III hereafter is data in a form analogous to that set out in Table II. The color absorption data was measured at a light wavelength of 425 nm. in a 1 cm. cell using a solution prepared by dissolving 100 milligrams of the exposed disc in 5 milliliter of chloroform.

TABLE III

| Ex. No. | Stabilizer Component | Amount (phr) | Absorbance (425 nm) |
|---|---|---|---|
| 13 | control | none | 0.048 |
| 14 | (a) pentaerythritol tetrakis[3-(3,5-di-t-butyl-4-hydroxyphenyl)-propionate] | 0.05 | |
|  | (b) diphenylphosphite | 0.05 | |
|  | Total | 0.10 | 0.025 |
| 15 | (a) pentaerythritol tetrakis[3-(3,5-di-t-butyl-4-hydroxyphenyl)-propionate] | 0.15 | |
|  | (b) diphenylphosphite | 0.15 | |
|  | Total | 0.30 | 0.0155 |
| 16 | (a) pentaerythritol tetrakis[3-(3,5-di-t-butyl-4-hydroxyphenyl)-propionate] | 0.25 | |
|  | (b) diphenylphosphite | 0.25 | |
|  | Total | 0.50 | 0.050 |

EXAMPLES 17–19

1,1-Dichloro-2,2-bis(4-hydrophenyl)ethylene polycarbonate having an intrinsic viscosity of 0.52 as measured in methylene chloride containing stabilizer combinations were injection molded at a temperature of about 507° F. into a mold with a surface temperature of about 200° F. The resulting injection molded polycarbonates were evaluated for color intensity and color code in accordance with a General Electric procedure which measures color intensity (CI) indicative of the lightness or darkness of color and color code (CC) indicative of the predominant color (hue), e.g. violet, blue, green, yellow, orange or red. The color index and color code of the 1,1-dichloro-2,2-bis(4-hydroxyphenyl)ethylene polycarbonate was determined by measuring the light absorbance at 436, 490, 546, 570, 620 and 660 nm. or millimicrons in the 10 cm. cell of a solution prepared by dissolving 2.5 grams of the injection molded product in 50 milliliters of methylene chloride.

The numerical values for the color intensity were calculated according to the following equation:

$$CI = 10(P + N),$$

where $P = A_{436} + A_{490} + A_{546}$ and $N = A_{570} + A_{620} + A_{660}$ and the color code was calculated according to the equation:

$$CC = 10[(P - N)/(P + N)],$$

wherein P and N are as defined hereinbefore.

A low color index number, e.g. 7.8, identifies a composition having improved color and improved thermal stability by contrast with a control which has a higher color index value, e.g. 29.5.

A summary of the results of the evaluation is set out in Table IV:

TABLE IV

| Ex. No. | Stabilizer Component | Amount (phr) | C.C. | C.I. |
|---|---|---|---|---|
| 17 | control | none | 5.2 | 29.5 |
| 18 | (a) pentaerythritol tetrakis 3-(3,5-di-t-butyl-4-hydroxyphenyl)-propionate | 0.10 | | |
|  | (b) diphenyldecylphosphite | 0.066 | | |
|  | (c) 3,4-epoxycyclohexylmethyl-3,4-epoxycyclohexyl carboxylate | 0.076 | | |
|  | (d) cadmium octanoate (1) | 0.058 | | |
|  | Total | 0.30 | 6.2 | 11.0 |
| 19 | (a) pentaerythritol tetrakis 3-(3,5-di-t-butyl-4-hydroxyphenyl)-propionate | 0.15 | | |
|  | (b) diphenylphosphite | 0.15 | | |
|  | Total | 0.30 | 3.7 | 7.8 |
| | (1) 50% by weight octanoic acid | | | |

EXAMPLES 20–21

A polymer blend comprising 85 parts by weight of 1,1-dichloro-2,2-bis(4-hydroxyphenyl)ethylene polycarbonate and 15 parts of a bisphenol-A polycarbonate having an intrinsic viscosity of 0.52 as measured in methylene chloride prepared by the reaction by an aqueous alkaline solution of bis(4-hydroxyphenyl)propane-2,2 with phosgene carried out in the presence of triethylamine and methylene chloride in accordance with standard commercial reaction conditions was extruded and injection molded to provide a polymer blend having an intrinsic viscosity of 0.47 as measured in methylene chloride at 25.3° C. The polycarbonate blends was injection molded at a temperature of about 507° F. into a mold with a surface temperature of about 200° F.

Color evaluation of the polycarbonate blends was performed in a manner analogous to that of Examples 17–19.

A summary of the results is set out in Table V which follows:

TABLE V

| Example No. | Stabilizer Component | Amount (phr) | C.I. |
|---|---|---|---|
| 20 | control | none | 18.0 |
| 21 | (a) pentaerythritol tetrakis 3-(3,5-di-t-butyl-4-hydroxyphenyl)-propionate | 0.10 | |
| | (b) diphenyldecylphosphite | 0.066 | |
| | (c) 3,4-epoxycyclohexylmethyl-3,4-epoxycyclohexyl carboxylate | 0.076 | |
| | (d) cadmium octanoate (1) | 0.058 | |
| | Total | 0.30 | 14.0 |

(1) 50% by weight octanoic acid.

Although the above illustrative examples describe the color absorption, color index and color code for specific 1,1-dichloro-2,2-bis(4-hydroxyphenyl)ethylene polycarbonates and blends thereof, analogous results are obtained when other halobisphenolethylene polycarbonates and other blends thereof are substituted for the polycarbonates employed in the specific examples.

The stabilized halobisphenolethylene polycarbonates can be molded or formed into films, sheets, fibers, laminates or other molded articles including reinforced articles by conventional molding techniques.

It will be apparent to those skilled in the art that other changes and modifications can be made in the particular embodiments of the invention described herein and said modifications and embodiments are within the full intended scope of the invention as defined by the appended claims.

We claim:

1. A thermally stable, color-stabilized halobisphenolethylene polycarbonate comprising:
(I) from (a) about 1–100 parts by weight of polycarbonate halobis(phenyl)ethylene units of formula (A):

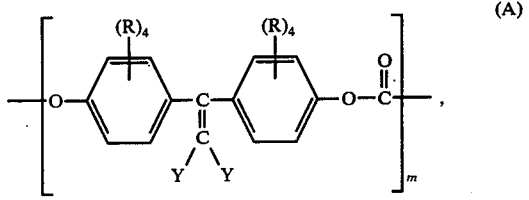

where independently each R is hydrogen, chlorine, bromine or a $C_{1-30}$ monovalent hydrocarbon or hydrocarbonoxy group, each Y is hydrogen, chlorine or bromine, subject to the proviso that at least one Y is chlorine or bromine, and $m$ is an integer of at least 2, to (b) about 99–0 parts by weight of a polycarbonate containing units of formula (B):

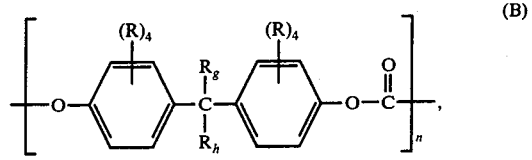

where independently each R is as defined hereinbefore, and independently $R_g$ and $R_h$ are hydrogen or a $C_{1-30}$ monovalent hydrocarbon group, $n$ is an integer of at least 2, and (II) an effective amount of a stabilizing component comprising an esterified hindered phenol of the formulas:

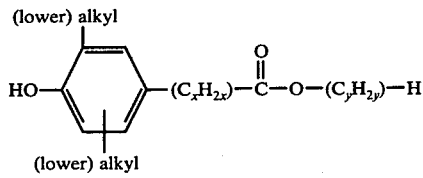

in which $x$ has a value of from 0 to 6, inclusively, and $y$ has a value of from 6 to 30, inclusively;

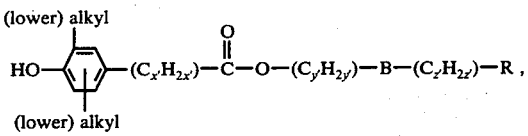

wherein $x'$ has a value of from 0 to 6, inclusively, each of $y'$ and $z'$ has a value of from 2 to 20, inclusively, R is a member consisting of hydrogen, alkanoyloxy or

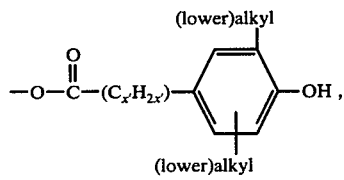

B is a member consisting of a divalent oxygen atom or the group

in which A is alkyl or alkanoyl; and

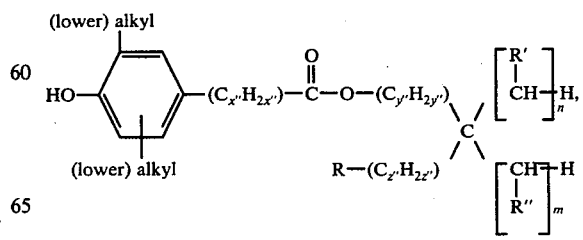

in which R is hydrogen, alkanoyloxy, or

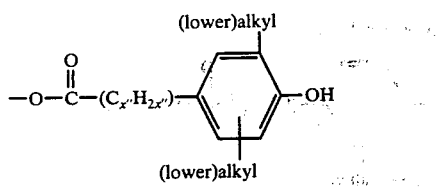

each of R' and R" is alkanoyloxy or

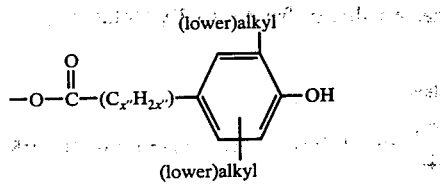

$x''$ has a value of from 1 to 6, inclusively, wherein each of $y''$, $z''$, $n$ and $m$ independently has a value of from 0 to 6, inclusively, at least one of $y''$, $z''$, $n$ and $m$ having a value other than 0 and the sum of $n$ and $m$ being no greater than 6 and being at least 1 when R is hydrogen and the sum of $y''$ and $z''$ being at least 1 when R is other than hydrogen, and

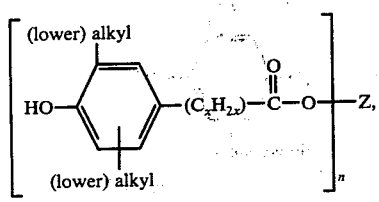

wherein $x$ has a value of from 1 to 6, $n$ has a value of from 2 to 6, Z is an aliphatic hydrocarbon of the formula:

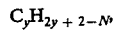

in which $y$ has a value of from 2 to 18 when $n$ is 2 and a value of 3 to 6 when $n$ is greater than 2, the value of $y$ in all cases being equal to or greater than that of $n$, or Z is a heterocyclic of the formula:

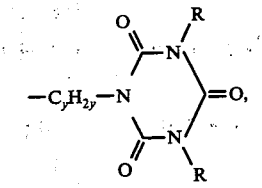

in which $y$ has a value of from 1 to 6, R is a member consisting of alkyl or

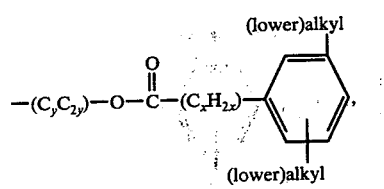

in which $x$ has a value of from 1 to 6 and $y$ has a value of from 1 to 6.

2. A claim 1 composition, wherein I(a) the polycarbonate units are of the formula:

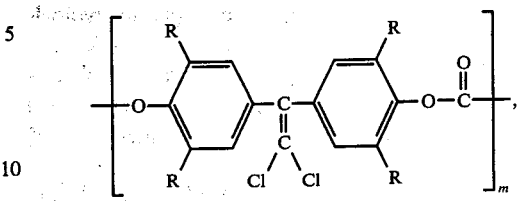

where independently each R is hydrogen, chlorine, bromine, $C_{1-4}$ alkyl or phenyl, $m$ is an integer of at least 2, wherein I(b) the polycarbonate units are of the formula:

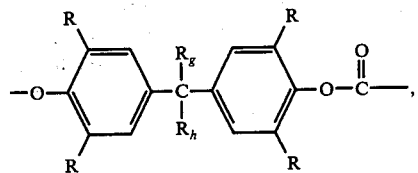

where independently each R is as defined hereinbefore, and independently each $R_g$ and $R_h$ is hydrogen, $C_{1-4}$ alkyl or phenyl, $n$ is an integer of at least 2, and wherein II the esterified hindered phenol is present in an amount of from 0.025 to 1.0 parts per 100 parts by weight of halobisphenolethylene polycarbonate.

3. The claim 2 composition, further comprising III an organic phosphite of the formula:

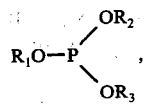

where $R_1$, $R_2$, and $R_3$ are independently selected from the group consisting of hydrogen, alkyl, aryl, cycloalkyl, arylalkyl and alkaryl and combinations thereof subject to the proviso that at least one $R_1$, $R_2$ or $R_3$ is other than hydrogen or a group directly bonded to an oxygen atom by phenyl ring carbon atom, subject to the proviso that when $R_2$ and $R_3$ are phenyl, $R_1$ can be hydrogen.

4. The claim 3 composition, further comprising (IV) an epoxide.

5. The claim 4 composition, where the epoxide is selected from the group consisting of (a) aliphatic epoxides represented by the formula:

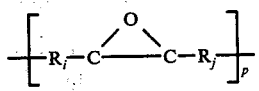

wherein $R_i$ and $R_j$ are independently selected from $C_{1-24}$ alkyl groups and $p$ is an integer of from 1 to about 10, (b) cycloaliphatic epoxides containing 1-2 aliphatic rings of 6 carbon atoms each with at least one oxygen bridge being attached to adjacent carbon atoms in at least one cycloaliphatic ring, and (c) aromatic epoxides selected from aromatic glycidyl ether or aromatic diglycidyl ethers containing 1-3 rings, or aromatic polyglycidyl ethers containing 1-3 aromatic rings.

6. The claim 5 composition further comprising (V) a cadmium, barium or cerium salt of an aliphatic, cycloaliphatic, or aromatic carboxylic acid or a carbonic acid.

7. The claim 1 composition, wherein I(a) the polycarbonate unit R substituents are hydrogen, and the I(b) the polycarbonate unit R substituents are hydrogen, and the $R_g$ and $R_h$ substituents are methyl.

8. The claim 1 composition, wherein I(a) the polycarbonate unit R substituents are hydrogen, at least one Y substituent is chlorine and the other Y substituent is hydrogen, and I(b) the polycarbonate unit substituents are hydrogen, and the $R_g$ and $R_h$ substituents are methyl.

9. A thermally stable, color-stabilized halobisphenolethylene polycarbonate comprising:

(I) from (a) about 1–100 parts by weight of halobis(phenol)ethylene polycarbonate units for formula (A):

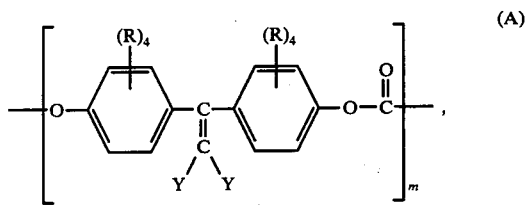

where independently each R is hydrogen, chlorine, bromine or a $C_{1-30}$ monovalent hydrocarbon or hydrocarbonoxy group, each Y is hydrogen, chlorine, or bromine subject to the proviso that at least one Y is chlorine or bromine, and m is an integer of at least 2, to (b) about 99–0 parts by weight of arene carbonate units of formula (B):

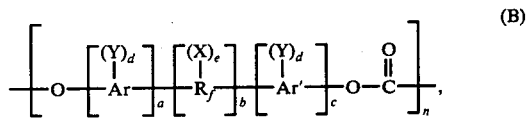

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, a halogen, an ether group of the formula-OE, wherein E is a monovalent hydrocarbon radical similar to X, a monovalent hydrocarbon group of the type represented by $R_f$, d represents a whole number of at least 1, c represents a whole number equal to at least 0 or more, a, b and c represent whole numbers including 0, a or c but not both may be 0, and wherein n is an integer of at least 2, and (II) an effective amount of stabilizer comprising an esterified hindered phenol of the formulas:

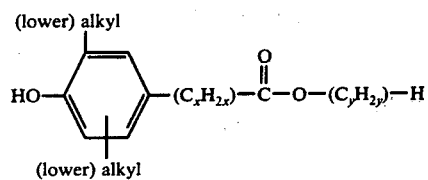

in which x has a value of from 0 to 6, inclusively, and y has a value of from 6 to 30, inclusively;

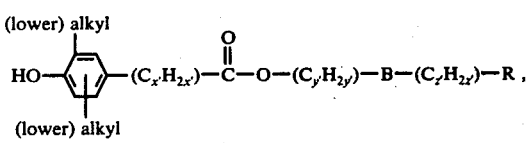

wherein x' has a value of from 0 to 6, inclusively, each of y' and z' has a value of from 2 to 20, inclusively, R is a member consisting of hydrogen, alkanoyloxy or

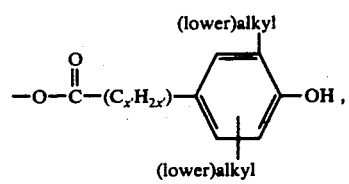

B is a member consisting of a divalent oxygen atom or the group

in which A is alkyl or alkanoyl; and

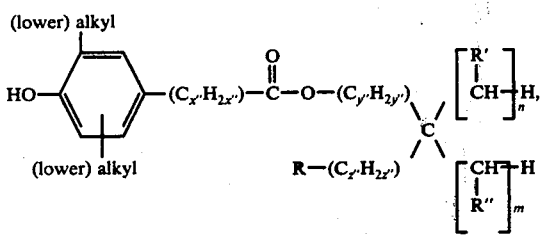

in which R is hydrogen, alkanoyloxy, or

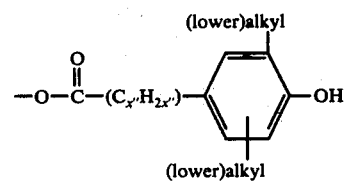

each of R' and R" is alkanoyloxy or

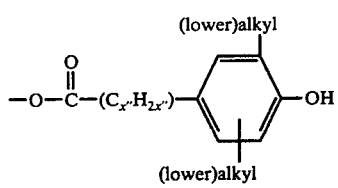

$x''$ has a value of from 1 to 6, inclusively, wherein each of $y''$, $z''$, $n$ and $m$ independently has a value of from 0 to 6, inclusively, at least one of $y''$, $z''$, $n$ and $m$ having a value other than 0 and the sum of $n$ and $m$ being no greater than 6 and being at least 1 when R is hydrogen an the sum of $y''$ and $z''$ being at least 1 when R is other than hydrogen, and

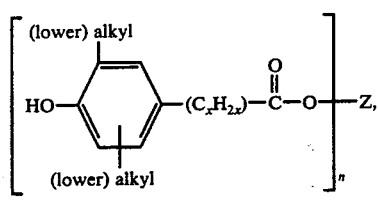

wherein $x$ has a value of from 1 to 6, $n$ has a value of from 2 to 6, Z is an aliphatic hydrocarbon of the formula:

$C_yH_{2y+2-n}$, in which $y$ has a value of from 2 to 18 when $n$ is 2 and a value of 3 to 6 when $n$ is greater than 2, the value of $y$ in all cases being equal to or greater than that of $n$, or Z is a heterocyclic of the formula:

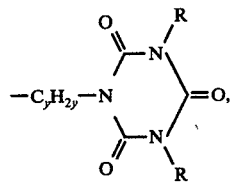

in which $y$ has a value of from 1 to 6, R is a member consisting of alkyl or

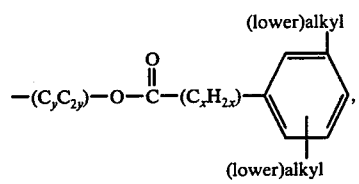

in which $x$ has a value of from 1 to 6 and $y$ has a value of from 1 to 6.

* * * * *